Figure 1:
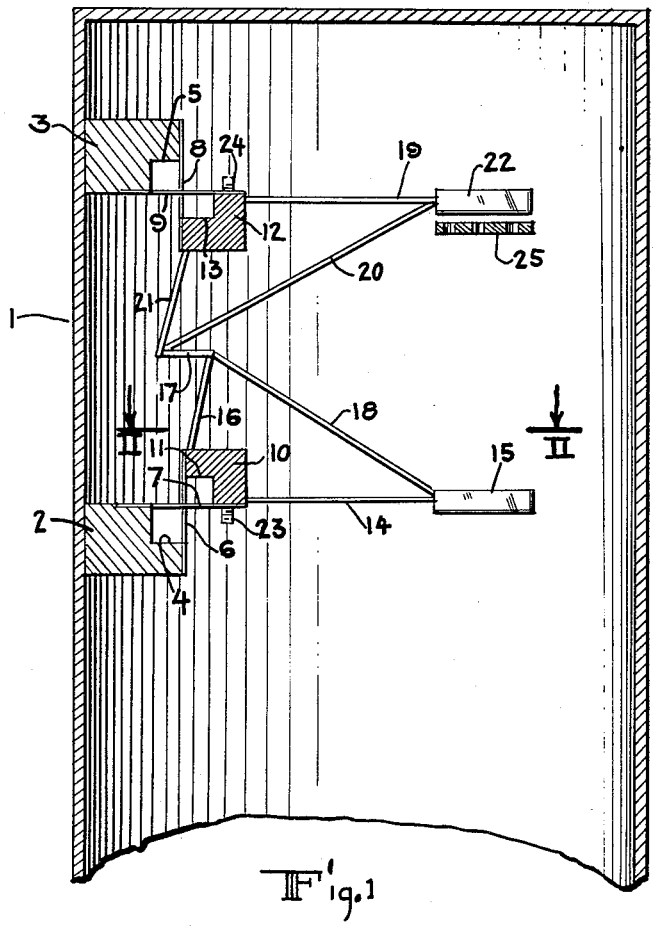

INVENTOR
Gotthard V.A. Gustafsson
BY
his ATTORNEYS

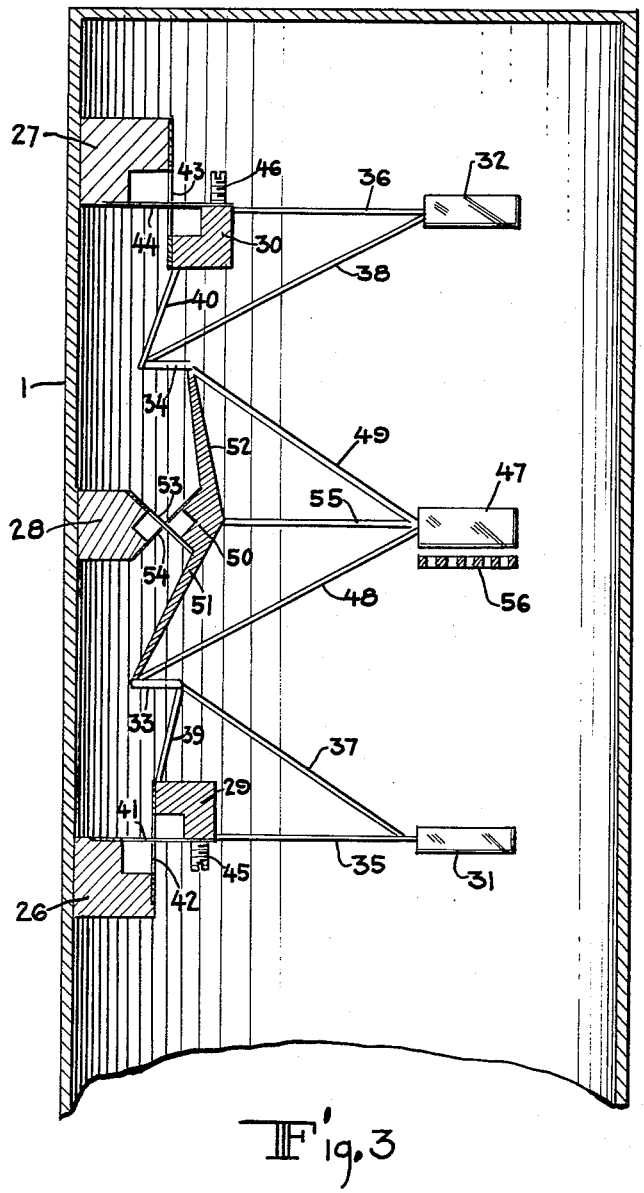

3,180,151
INSTRUMENT FOR AND METHOD OF AERIAL MEASUREMENT OF DERIVATIVES OF THE EARTH'S GRAVITY FIELD
Gotthard V. A. Gustafsson, Bromma, Sweden, assignor to Hans T. F. Lundberg, Toronto, Ontario, Canada
Filed Dec. 15, 1958, Ser. No. 780,634
18 Claims. (Cl. 73—382)

This invention relates to an instrument for and method of aerial measurement of derivatives of the earth's gravity field, and has for an object the provision of an instrument which is designed and adapted for aerial transportation over terrain to be explored for the detection and location of mineral deposits, such as ores, oil and gas, which instrument is so constructed that it eliminates or cancels out the direct effects of the mean gravity pull while simultaneously measuring and recording derivatives of the gravity field, e.g. the gradient of the vertical component of the field and the variations in the said gradient.

Another object is to provide such an instrument that embodies means for its own control against unwanted lateral movements.

Another object is to provide such an instrument which includes a plurality of gravity sensitive masses that are connected with movable means in such manner that the gravity pull upon each mass counterbalances that upon the other or others, while the gradient of gravity engenders a movement of the instrument or at least one of the masses thereof, which can be apprehended and caused to activate cooperating means for noting, measuring, and recording the said gradient and changes therein as the instrument passes over successive points in the ground area being explored.

Another object is to provide such an instrument in which the masses are carried by frames, or the like, that are connected with fixed supporting means through flexible elements, or their equivalent, and are capable of a slight turning movement about the axes of said flexible elements; and in which the masses are so connected through their frames with the above mentioned movable means that the pull of gravity upon the masses will tend to shift the said movable means in opposite directions while the effect of the gradient of gravity will induce a slight rotary movement of the masses about the axes of said flexible elements.

Another object is to provide such an instrument which includes means for insuring that the gravity centers of the masses with their frames do not become closer together or further apart than the distance between the axes of the above mentioned flexible elements, in order to balance the instrument against the effect of horizontal accelerations at right angles to the said axes.

Another object is to provide such an instrument in which the pull of the mean gravity upon the several masses is balanced so that the first derivative of the vertical component of the gravity field can be directly detected and measured.

Another object is to provide such an instrument in which more than two masses are embodied and in which one mass is the equivalent of a plurality of other masses, the said masses being so arranged that both the pull of mean gravity and the first derivative of the vertical component of the gravity field are balanced in their effect upon the masses while the second derivative can be directly detected and measured.

Another object is to provide an instrument as described in the last preceding paragraph in which there are three masses arranged in vertical alignment, the middle mass is the equivalent of the other two, and the measuring is effected by the middle mass.

A further object is to provide certain improvements in the form, construction, arrangement, and material of the several elements of the instrument, as well as novel steps in the method of procedure when utilizing the instrument during exploration, whereby the above named objects and others inherent in the invention may be efficiently attained.

In brief summary, the invention comprehends an instrument in which a plurality of gravity sensitive masses are mechanically but flexibly supported from one inner side of a chamber, preferably evacuated, each mass being carried by a frame, and the plurality of frames being connected by a floating link; or the like. The masses are positioned in vertical alignment and their connection provides that the pull of gravity causes them to exert opposing forces on the connecting link so that the mean gravity effect is balanced, while the effect of the first derivative of the vertical component of the gravity field activates the instrument owing to the vertical spacing of the masses and produces a slight rotary movement around the axes of the flexible supporting means which varies the distance of one of the masses from an adjacently located member of a measuring means, such as an electrode plate or grid in circuit with a capacitanace bridge and recording device, whereby the said first derivative is detected, measured, and recorded, as the instrument is flown over terrain being explored for valuable deposits, such as ores, oil, and gas. In the selected embodiment of the invention just described, a pair of similar masses are employed, and they may be composed of such solid material as, for instance, gold or silver, and have a weight of, say, between one and one hundred grams, although the named materials and weights are neither exclusive nor definite as limits. In a modified form of the invention, three masses are employed, in vertical alignment, with their frames, flexible supporting means, and two connecting links. The middle mass is equal in weight to the combined weight of the other two, and with it is associated the member of the measuring means. In the use of this form of the invention, both the pull of mean gravity and the first derivative of its vertical component are balanced, while the second derivative is detected, measured, and recorded. Both forms of the invention include means for insuring that the gravity centers of the masses have the same spacing as the axes of the flexible supports to avoid undesired effects of horizontal accelerations in the use of the instrument.

Figure 2:
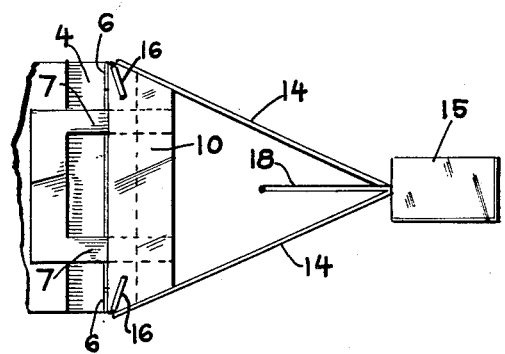

Practical embodiments of the invention are represented in the accompanying drawings, in which FIG. 1 represents a side elevation, partly in section and partly broken, of the form adapted to measure the first derivative;

FIG. 2 represents a plan view of the lower mass, its frame, and its supporting means, taken in the plane of the line II—II of FIG. 1, looking in the direction of the arrows; and FIG. 3 represents a view similar to FIG. 1, but illustrating the form adapted to measure the second derivative.

For a long time there has been a general understanding among geophysicists that anomalies in the earth's sub-surface structure and substance are frequently indicative, directly or indirectly, of the existence and approximate location of valuable mineral deposits, such as oil, gas, and ores; and sometimes, indeed, of the actual size and character of the deposits themselves. This knowledge may be said to have constituted the basis of geophysical exploration, and one aspect of the significant anomalies involves gravitational conditions which are related to or reflective of variations in density. Accordingly, the professional practice of geophysical exploration has included, as one of its branches, measurements of the earth's gravity field, and/or one or more components thereof, and/or gradient changes therein. Various instruments have been devised and put to use in this connection, such as those of the pedulum and torsion balance type, as well as the gravimeter, all of which operate from fixed positions on the earth's surface.

It has been discovered and recognized that it is possible to ascertain the vertical gradient of gravity through successive measurements with the gravimeter placed at different elevations in a support positioned on the ground, and a modern presentation of this procedure, with its attendant difficulties in operation and uncertainties in results, together with recital of pertinent antecedent experiments, is found in an article by Stephen Thyssen-Bornemisza and W. F. Stackler, published in Geophysics, vol. XXI, pp. 771–779, July 1956.

The factor of topography is one that with great frequency intrudes upon exploration conducted on the earth's surface, and such features as dense forests, heavy undergrowth, marshland, streams, and rough hills, among many, can present almost insuperable barriers to practical operations or, at least, involve great delays and expense. An attempt to escape these impediments was made by C. A. Heiland, as disclosed in U.S. Patent No. 2,626,525, issued January 27, 1953. He proposed to make gravimetric investigations of areas "regardless of the character of the surface topography" and to detect gravitational anomalies "in regions which would otherwise be inaccessible, such as swamps, jungles and the like." The plan was to carry a gravimeter to desired points by helicopter or blimp and lower the instrument by cable to the ground. The instrument was supported in a skeleton tripod fitted with spikes and was sufficient in weight so that the spikes entered the earth and held the instrument in position while also serving as an anchor for the aircraft. Means for automatic leveling and dial reading of the gravity measurement were embodied in the apparatus "so that, when the instrument is subsequently hoisted back onto the aircraft, that reading may be taken off by the observer." It is pointed out in the patent that the gravity reading would be without value unless means were provided for determining accurately the elevation of the station, and two forms of such means are suggested, one telescopic and "somewhat complicated," and the other "less accurate but more rapid" involving the use of radio transmitters at two or more ground stations. Gravity measurements thus achieved are repeated "at desired places" in the area being explored the instrument being transported by air from station to station and the measurements being taken on the ground. The patent does not explain how topographic hindrances to the lowering of the instrument to the earth, e.g., dense forests or other vegetable growth; or difficulties in ground support and leveling of the instrument, e.g., swamps and rocks; are overcome.

In the gravity vector field the horizontal and vertical components are very unequal, the latter, in fact, being almost equal to the total vector, and it has become an accepted fact that gradient measurements, as distinguished from absolute measurements, and, particularly, vertical gradient measurements, afford the more significant data with respect to the pursuit of geophysical exploration for mineral deposits. The vertical gradient is the first derivative of the field in a vertical direction, and equations expressive of this derivative as well as of the second derivative are familiar to those engaged in this professional activity. The said derivatives, emphatically, have the inherent virtue of readily providing detailed information of value but, until recently, it has been necessary to compute the said derivatives from data obtained by direct observations conducted on the ground by well known instruments for measuring gravity, such as the torsion balance, pendulum, or gravimeter hereinabove mentioned. This procedure involves not only the cumbersome and time consuming work previously explained, but also extensive mathematical calculations that are inevitably vulnerable to human error; while the equations and formulae which have been established for use in the calculations are recognized as merely approximate. See articles by Thomas A. Elkins in Geophysics, vol. XVI, pp. 29–50, January 1951; by Otto Rosenback in Geophysical Prospecting, vol. II, No. 1, pp. 1–23, March 1954 and June 1954, pp. 128–138; and by Herman A. Ackerman and C. Hewitt Dix in Geophysics, vol. XX, No. 1, pp. 148–154, January 1955. These writings are thought clearly to demonstrate that derivatives of the vertical component of the gravity field, i.e., functions of the vertical gradient of the said component, are significantly informative of gravity measurements with respect to geophysical exploration for mineral deposits in the earth, but that the said derivatives have been determined only by cumbersome and slow procedure on the ground or by mathematical calculation from instrumental gravity measurements, which calculations have been not only extensive and subject to human error, but have also been founded on "approximate" formulae.

Referring now specifically to the form of the invention exhibited in FIGS. 1 and 2, an evacuated chamber is shown in part and marked 1. It may be composed of any suitable material, e.g., aluminum, is preferably cylindrical in form, and of a size not over one foot in height and less than half that in width; although these details are neither essential nor restrictive.

To the inner wall of the chamber are firmly secured lower and upper supporting blocks, denoted by 2 and 3 respectively, which may also be composed of aluminum. The upper inner edge of block 2 is cut away, as indicated at 4, and a similar formation is provided at the lower inner edge of block 3, which is marked 5. A leaf spring, made of appropriate steel, or the like, consisting of a pair of vertical members 6, 6, and a pair of horizontal members 7, 7, has its said pairs of members disposed at right angles to each other and fast to the vertical face and top, respectively, of the lower block 2, with the vertical members projecting upwardly and the horizontal members projecting laterally from said block. A corresponding leaf spring is secured to the upper block 3, only one of each pair of members being shown and marked 8 and 9.

The projecting portions of springs 6, 6, 7, 7, are attached to a lower header 10, which is cut away at its lower outer edge, as indicated at 11, all as is clearly shown in FIG. 1; while the projecting portions of the upper leaf spring 8, 9, are similarly attached to an upper header 12 that has a cut away upper outer edge 13. The cut away parts of the supporting blocks and headers lend resiliency to the leaf springs, and it will be evident that their projecting portions above mentioned may flex, with the central points at which the vertical and horizontal members meet or cross serving as horizontal pivots or axes of flexion.

The header 10 is connected by a rigid frame member 14 with a lower mass 15, which, as explained in the foregoing summary of the invention, is composed of a suitable metal that is gravity responsive, gold or silver being preferred, and may properly have a weight of, say, anywhere between one and one hundred grams. The member 14 is of V-shape, as shown in FIG. 2, and it embraces the two ends of header 10. The latter is also connected by a rigid V-shaped frame member 16, with one end of a floating link 17, and the said end of the link is connected by frame member 18, that consists of a single bar, with the lower mass 15. The headers and the frame members consist of a suitable metal, aluminum being chosen as highly satisfactory, but the link 17 should be of flexible steel, such as a leaf spring, that will readily bend but is rigid in length direction.

Frame members 19, 20 and 21, identical with members 14, 18 and 16, connect the upper header 12 with an upper mass 22 and the other end of link 17, the mass 22 being identical with mass 15. Positioned below and above the headers 10 and 12, are adjustable elements 23 and 24, which may be set screws, the function of which is to assure that the centers of gravity of the masses 15 and 22 with their frames do not approach closer together or move further apart than the spacing of the horizontal axes or pivots of the leaf springs 6, 6, 7, 7, and 8, 9; thus avoiding undesired effects of horizontal accelerations. These set screws, or their equivalents, are shown as unsupported, but they could be carried by the headers 10 and 12 in brackets, or the like, projecting from the supports, which construction is so simple and conventional that it is not deemed necessary to illustrate the same.

The instrument also incorporates the activating element of a recording system which is shown as an electrode plate or grid 25 suitably supported by means (not shown) adjacent the mass 22, which element may be connected in circuit with a capacitance bridge supplied from a source of voltage, and appropriate recording device, e.g. oscillograph or tape, so that changes in distance between the mass 22 and element 25 produce correspondnig changes in the capacitance bridge that are automatically recorded. As the construction and arrangement of such an electric recording means are well within the knowledge of engineers in this field, no further showing or description is regarded as necessary.

In operation, as the instrument is flown by aircraft over terrain being explored, the two masses 15 and 22 will be subject to the force or pull of gravity and that force per se will be balanced because the pull on mass 15 will tend to move the floating link 17 to the right in FIG. 1, while the pull on mass 22 will have the opposite effect. However, as the two masses are spaced apart in vertical alignment, the effect of the gradient of the vertical component of the gravity field will cause a slight rotary motion of the instrument around the horizontal axes or pivots of the crossed leaf springs 6, 6, 7, 7 and 8, 9, with the result of moving the mass 22 further from or closer to the element 25, according to whether the gradient is positive or negative; and this change in distance between the said mass and element will produce the changes in capacitance that cause the record to be made. Thus, during the flight of the aircraft, changes in the gradient, i.e. first derivative, are recorded as they occur at different points and information of valuable signifiance to the exploring geophysicists is obtained and recorded.

It is important that the link 17 be normally positioned with its center in a direct line between the axes of said leaf springs, that it should be short as compared wtih the frame members 14, 16, 19 and 21, and that it should lie substantially at right angles to the frame members 16 and 21. The frame members 14 and 19, should be substantially horizontal.

When in the foregoing it has been said that certain parts are fastened, secured, or attached to others, any suitable means is intended, such, for instance, as screws, welding, or soldering. It is recognized that some metals lend themselves better than others to welding and soldering, but the normally skilled artisan will be aware of this and guide his procedure along lines of approved practice. It may be added that the making of two or more of the rigidly attached parts in unitary form is desirable when practical.

Turning now to the form of the invention shown in FIG. 3, it will be observed that there is embodied in large part a duplication of the features of FIGS. 1 and 2. Thus, there are lower and upper supports, here denoted by 26 and 27, fixed to the inner wall of chamber 1; but the form of this FIG. 3 also includes a third fixed support 28, between the other two. There are lower and upper headers 29 and 30, which are like the headers 10 and 12 of FIG. 1. Lower and upper masses 31 and 32 are counterparts of masses 15 and 22; while two floating links 33 and 34 in FIG. 3, are the same as link 17 of FIG. 1. Frame members 35 and 36, correspond with members 14 and 19; members 37 and 38 correspond with members 18 and 20; and members 39 and 40 correspond with members 16 and 21. Crossed leaf springs 41, 42 and 43, 44, are the same as springs 6, 6, 7, 7, and 8, 9; while adjustable elements 45 and 46 are like 23 and 24.

This form of FIG. 3, also embodies certain additional features. A third mass is included and denoted by 47. It is of the same composition as masses 31 and 32, but is twice their weight, and is located in vertical alignment with the other two at the same distance from each, so that the positioning is symmetrical. The mass 47 is connected by two like single bar frame members 48, 49, with one end of the links 33 and 34, respectively; the member 48 being connected to the end of the link 33 distant from the connection of frame member 37, and the member 49 being connected to the end of the link 34 distant from the connection of frame member 38. The ends of said links with which the members 48 and 49 connect are mutually connected by a frame member consisting of a central header 50 and a pair of identical V-shaped arms 51 and 52, which correspond with members 39 and 40. The central header 50 of the last named frame member is connected to the fixed support 28 by a crossed leaf spring 53, 54, which has its elements crossing at right angles but arranged at angles of forty five degrees to the vertical and horizontal, instead of being vertical and horizontal. The fixed support 28 and the header 50 of the frame member 50, 51, 52, are notched as shown in the drawing for the purpose of aiding the resiliency of the spring 53, 54. A final element in this construction is double bar frame member 55 which connects the mass 47 with the body portion 50, and corresponds with members 35 and 36. The center of the floating link 33 should be equally spaced from the axis of crossed springs 41, 42, and the axis of crossed springs 53, 54, while the center of link 34 should also be equidistant from the axis of 43, 44, and the axis of 53, 54.

Here, as in the embodiment of the invention shown in FIGS. 1 and 2, there is provision for recording the significant measurements and the activating element of the recording system is again an electrode plate or grid 56 which is a counterpart of the element 25 and similarly in circuit with a suitable recording system as previously described, except that, in the form of FIG. 3, the element is operatively associated with the large middle mass 47.

It will be clear that the mass 31 is capable of slight movement in a rotary direction around the horizontal central axis of spring 41, 42; that the mass 32 is capable of similar movement around the central horizontal axis of spring 43, 44; and the mass 47 has a like relationship to the central horizontal axis of spring 53, 54. Therefore, when subjected to the gravity field, the downward pull on mass 31 will tend to move the floating link 33 to the right in FIG. 3, while the pull on mass 47 will have the opposite effect. Likewise, the pull on mass 32 will tend to move the floating link 34 to the left in FIG. 3, while the pull on mass 47 will counteract this effect. Furthermore, the framework that carries mass 47 interconnects opposite ends of the two floating links by the members 48, 49, 50, 51, 52 and 55, that can partake of slight upward or downward displacement through the flexion of spring 53, 54, which movement is permitted by the floating links. Hence, this embodiment has a wider range of response to gravitational forces through the cancelling out, so to speak, of mean gravity and also the mean first derivative, or vertical gradient, while sensitively measuring the second vertical derivative.

The employment of this form of FIG. 3 in aerial exploration is the same as that already described for the form of FIGS. 1–2, but it will be evident that, in this form of FIG. 3, as just stated, not only is the force of mean gravity on mass 47 balanced by the two masses 31 and 32 with their flexible supporting means and floating links; but that the presence, size, positioning, and interconnection of the third mass 47, enables the instrument also to balance out the effect of the first derivative of the vertical gravity component, while the slight rotary movement under the influence of the second derivative causes change in position of the middle mass 47 with respect to the plate or electrode 56, resulting in the detection, measurement, and recording of the second derivative at various points of the terrain over which the instrument is flown.

Thus, in sum, the embodiment of the invention exhibited in FIGS. 1 and 2, provides means for automatically eliminating the effect of mean gravity, while measuring and recording the first derivative of the vertical component of the gravity field, commonly represented by the symbol, $dg/dz$, where $g$ denotes gravity and $z$ height; while the embodiment exhibited in FIG. 3, not only eliminates the effect of mean gravity but also the effect of the said first derivative, thus measuring and recording the second derivative of the vertical component of the gravity field, commonly represented by the symbol $d^2g/dz^2$.

The several parts shown in FIG. 3 may be fastened together as described in the case of FIGS. 1–2, and similar materials may be employed, preferably combining two or more parts in unitary form when practicable; and I desire it to be understood that various changes may be made in the form, construction, arrangement, and materials of the several parts of the instrument, and in the steps of the method followed in its use, without departing from the spirit and scope of the invention; hence, I do not intend to be limited to details herein shown or described except as the same may be included in the claims or be required by disclosure of the prior art.

What I claim is:

1. An instrument designed and adapted for aerial measurement of derivatives of the earth's gravity field comprising, a plurality of masses composed of material that is sensitive to the pull of the vertical component of gravity, fixed supporting means for the said masses, means connecting the masses with the supporting means for holding the masses in spaced vertical alignment so as to be responsive to the gradient of the vertical gravity component, said connecting means embodying pivotal axes for slight upward or downward movements of the masses in a rotary direction when subjected to the influence of the said gradient, and a floating link interposed vertically between and attached to the masses and the fixed supporting means, the parts being so constructed and arranged that, when subjected to the pull of the vertical component of gravity, the masses exert opposing forces on the floating link tending to shift it in opposite horizontal directions.

2. An instrument as defined in claim 1, which also includes an activating element of a recording system operatively positioned adjacent at least one of the masses for making a record reflective of the extent of said upward or downward movements.

3. An instrument as defined in claim 1, in which the said connecting means includes crossed members between each mass and the fixed supporting means, the said crossed members embodying axes at their intersections.

4. An instrument as defined in claim 3, in which the crossed members are flexible.

5. An instrument as defined in claim 1, in which the floating link is elongated with its opposite ends attached to the masses, and the opposing forces exerted on the link by the masses are lengthwise of the link.

6. An instrument as defined in claim 5, in which the floating link is positioned with its center normally in line with the said axes and the means attaching the link to the fixed supporting means is substantially at right angles to and longer than the link, and the latter is short as compared with the means connecting the masses with the supporting means.

7. An instrument as defined in claim 6, which also includes means operatively associated with the connecting means for preventing the centers of gravity of the masses and the connecting means from moving closer together or further apart than the spacing of the said axes.

8. An instrument as defined in claim 1 in which there are two masses.

9. An instrument as defined in claim 8, in which there are two masses, two fixed supporting means, two means connecting the masses with the supporting means each embodying a pivotal axis, and which also includes one floating link positioned between the axes with two means attaching the opposite ends of the link to the masses and two means attaching said opposite ends of the link to the supporting means.

10. An instrument as defined in claim 9, in which the two fixed supporting means are vertically spaced, the floating link is positioned vertically between the two axes, and the said two axes are positioned between the masses and the supporting means and between the link and the supporting means.

11. An instrument designed and adapted for aerial measurement of derivatives of the earth's gravity field comprising, a closed chamber, two supporting blocks secured to the inner wall of the chamber in spaced vertical alignment, two crossed leaf springs each having a vertical and horizontal portion secured to each block, two headers disposed in spaced vertical alignment to which the said portions of the springs are also secured with the intersections of the crossed springs constituting axes of rotation, a floating link positioned in vertical alignment with and midway between said axes, means connecting the opposite ends of the link with the headers, two masses in spaced vertical alignment, means connecting each mass with a header and with an opposite end of the link, and an activating element of a recording system operatively positioned adjacent at least one of the masses.

12. An instrument as defined in claim 11, in which the proximate portions of the blocks and headers are cut away to lend resiliency to the springs.

13. An instrument as defined in claim 1, in which there are three masses, in which the means connecting the masses with the fixed supporting means embodies three axes, in which there are two floating links, in which the upper mass and the middle mass are attached to opposite ends of one link, and the lower mass and middle mass are attached to opposite ends of the other link.

14. An instrument as defined in claim 13, in which the upper and lower masses are alike in weight and the middle mass is equal in weight to both the upper and lower masses.

15. An instrument as defined in claim 14, in which the fixed supporting means comprises three blocks in vertical alignment, the three axes are in vertical alignment, one floating link is in vertical alignment with and equally spaced from the upper and middle axes, and the other floating link is in vertical alignment with and equally spaced from the middle and lower axes.

16. An instrument as defined in claim 15, which also includes three headers in vertical alignment, the upper header being secured to the upper block by crossed leaf springs, the middle header being secured to the middle block by crossed leaf springs, the lower header being secured to the lower block by crossed leaf springs, and the intersections of all said crossed leaf springs constituting pivotal axes.

17. An instrument as defined in claim 13, which also includes an activating element of a recording system positioned adjacent the middle mass for making a record reflective of the extent of the upward and downward movements of said mass.

18. A method of aerial measurement of the second derivative of the vertical component of the earth's gravity field which includes the following steps: traversing the air above a selected terrain area with an instrument embodying means that is responsive to the pull of the second derivative of the vertical component; eliminating the effect of the mean gravity pull of the vertical component and the effect of the gravity pull of the first derivative of the vertical component upon said means by balancing each said pull; and measuring the response of the said means to the gravity pull of the said second derivative.

References Cited by the Examiner
UNITED STATES PATENTS

| | | | |
|---|---|---|---|
| 1,652,255 | 12/27 | Schweydar | 73—382 |
| 1,988,527 | 1/35 | Truman | 73—382 |
| 2,626,525 | 1/53 | Heiland | 73—382 |
| 2,674,885 | 4/54 | Silverman | 73—382 |
| 3,011,346 | 12/61 | Garvin | 73—382 |
| 3,011,347 | 12/61 | Boitnott | 73—382 |
| 3,038,338 | 6/62 | Boitnott | 73—382 |

RICHARD C. QUEISSER, *Primary Examiner.*

CHARLES A. CUTTING, ROBERT L. EVANS,
*Examiners.*